UNITED STATES PATENT OFFICE.

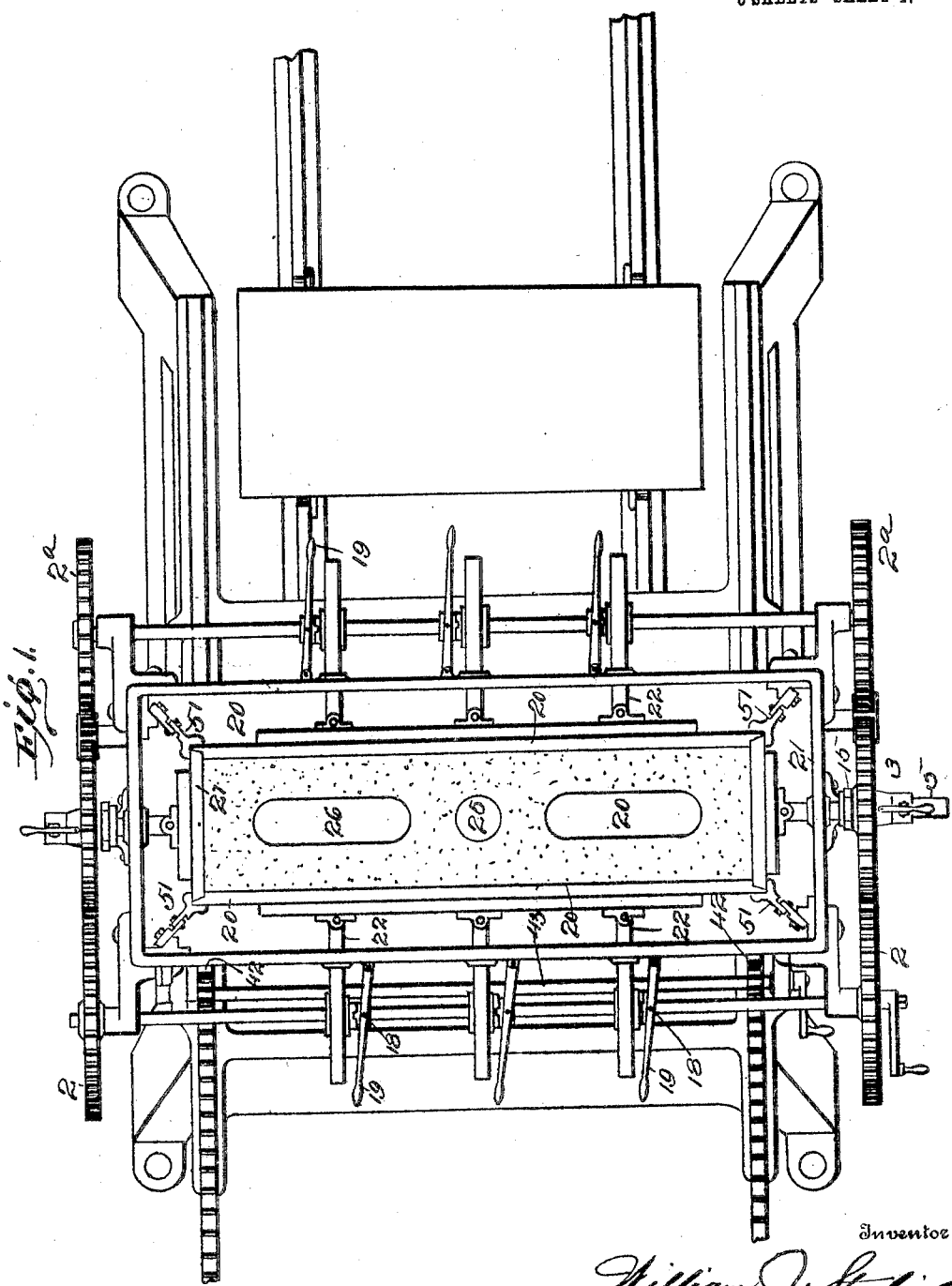

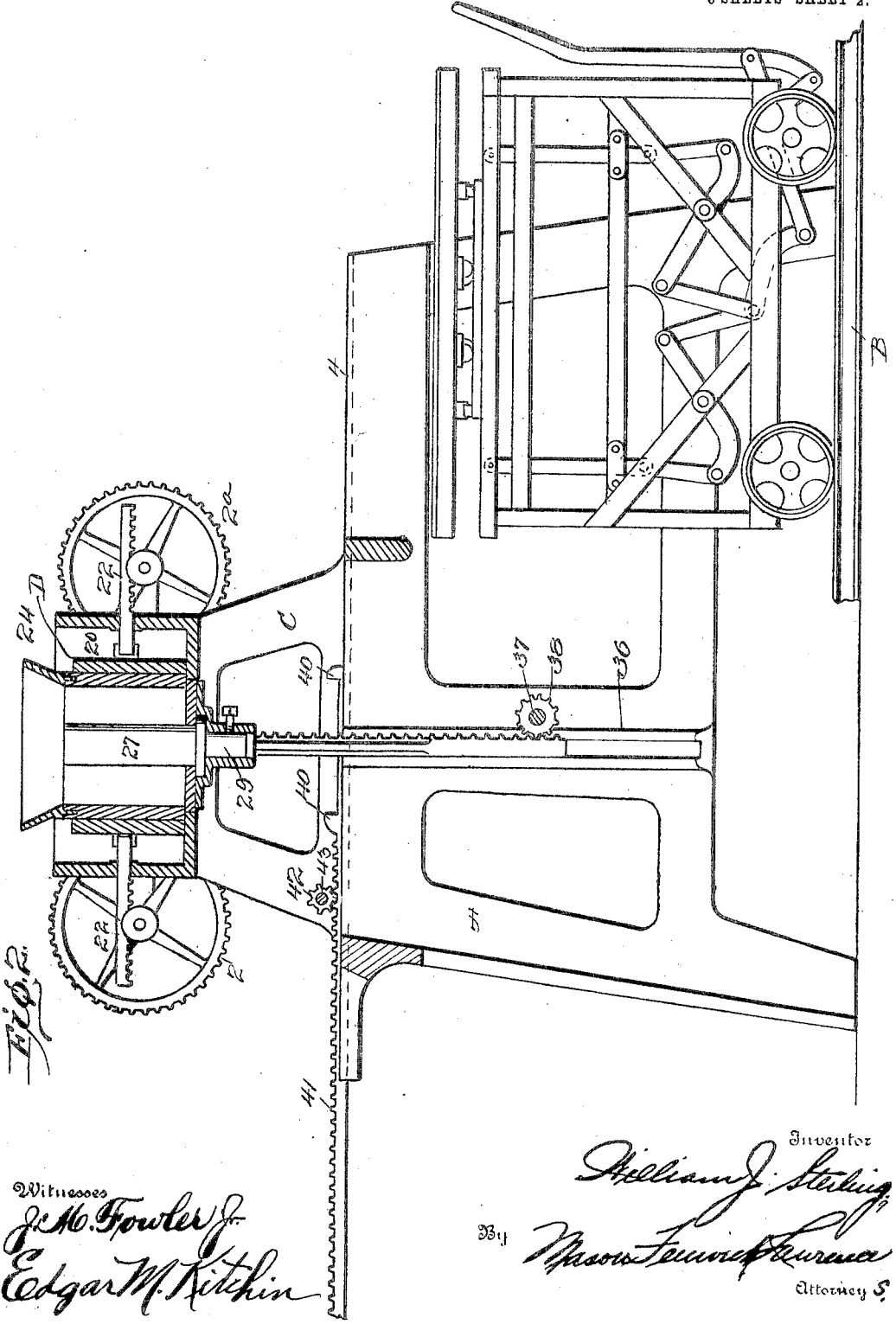

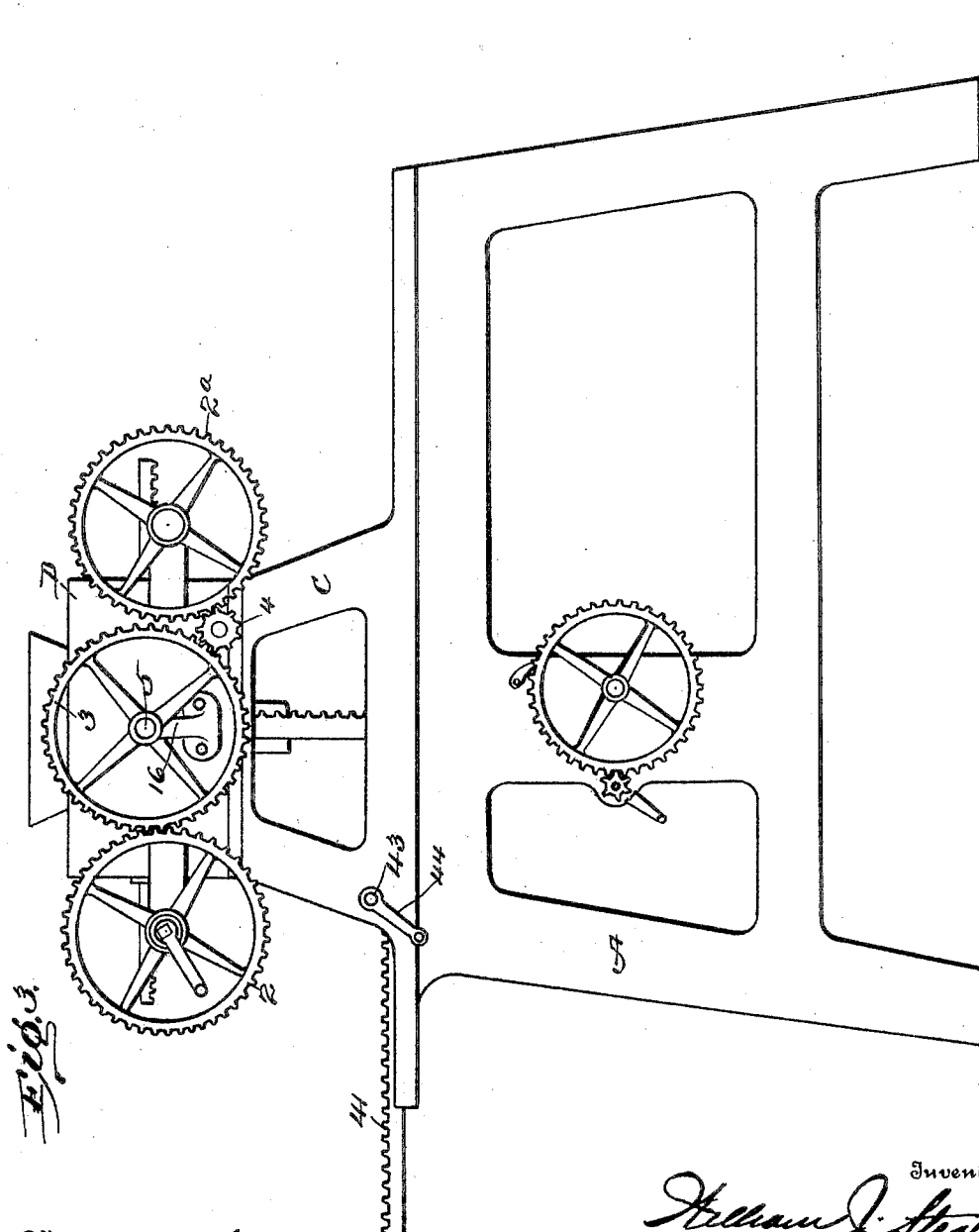

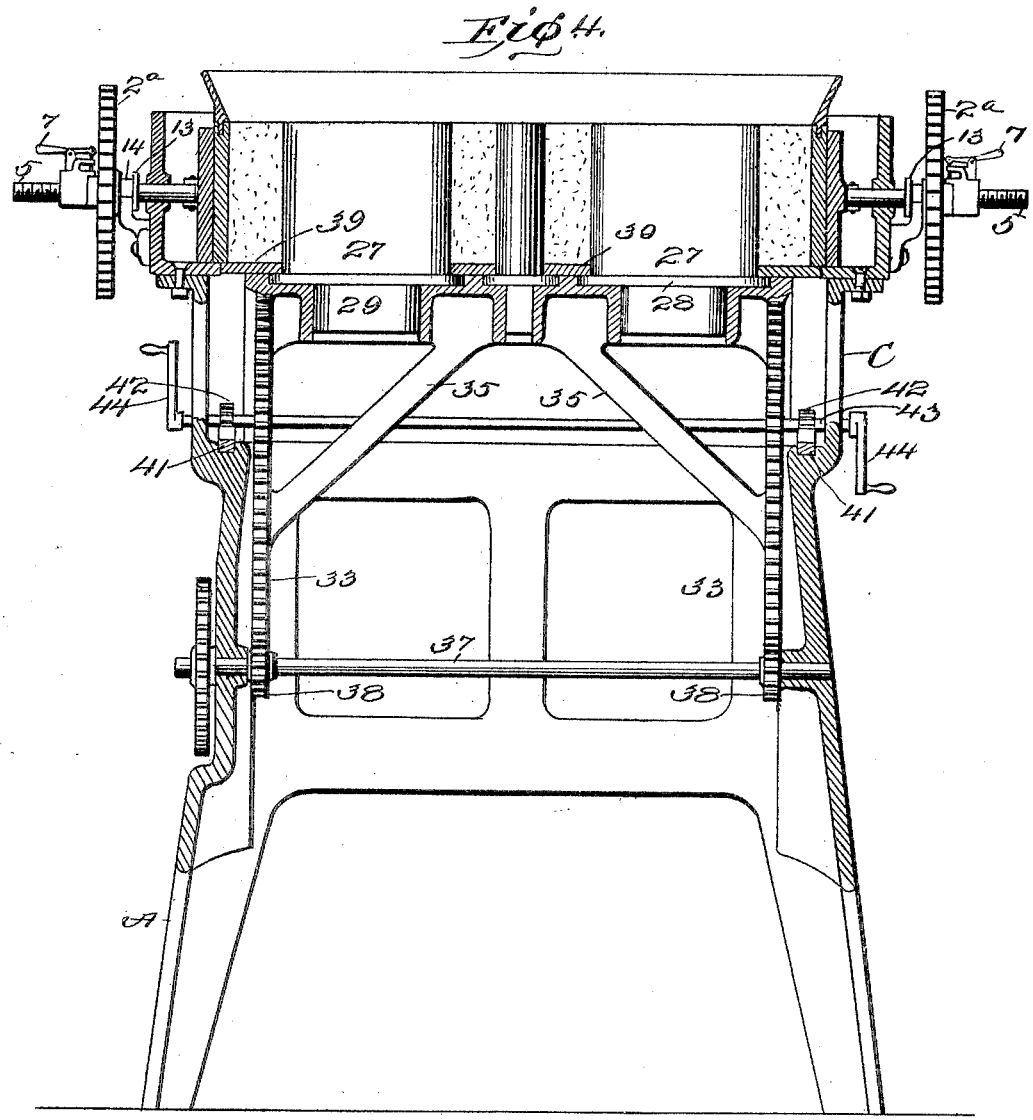

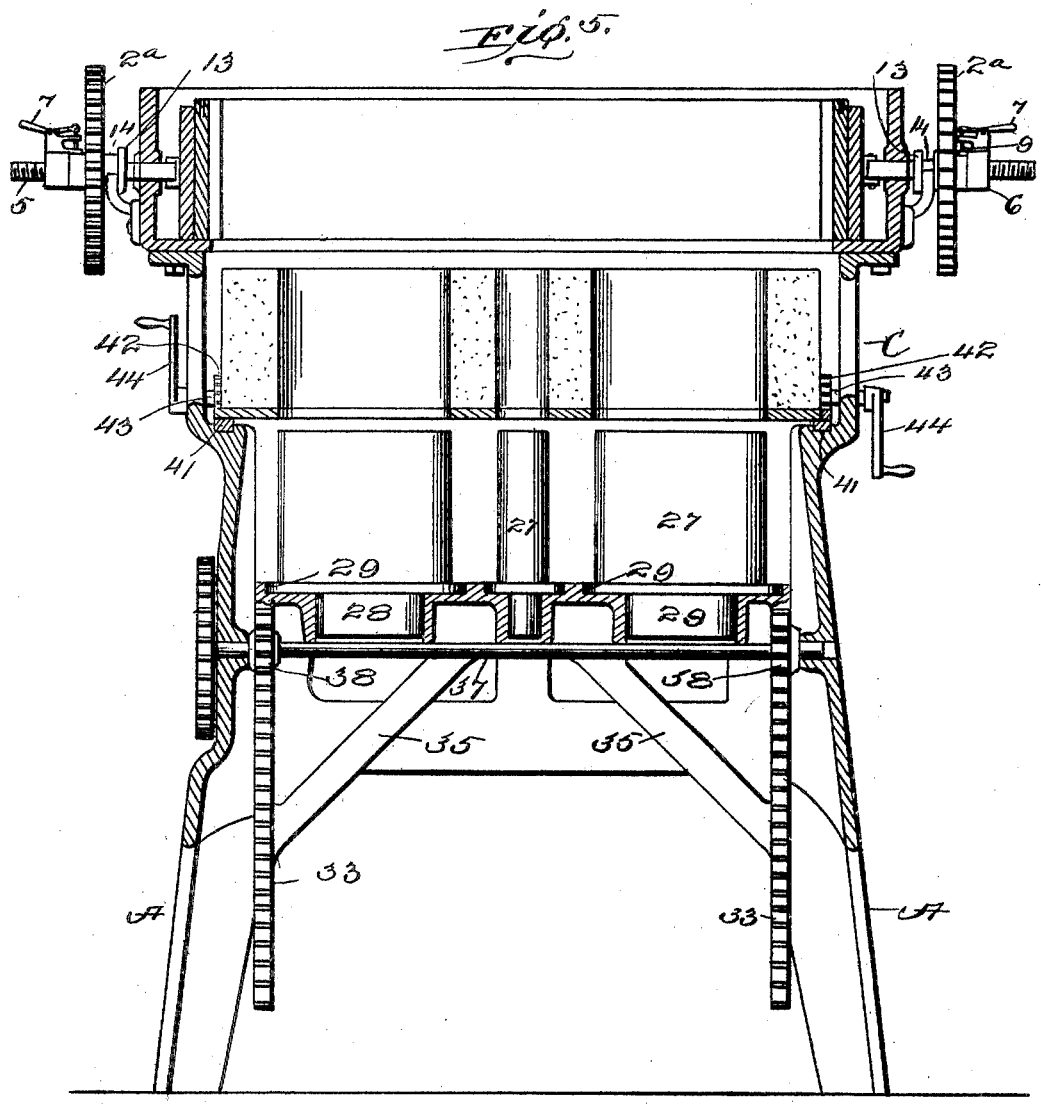

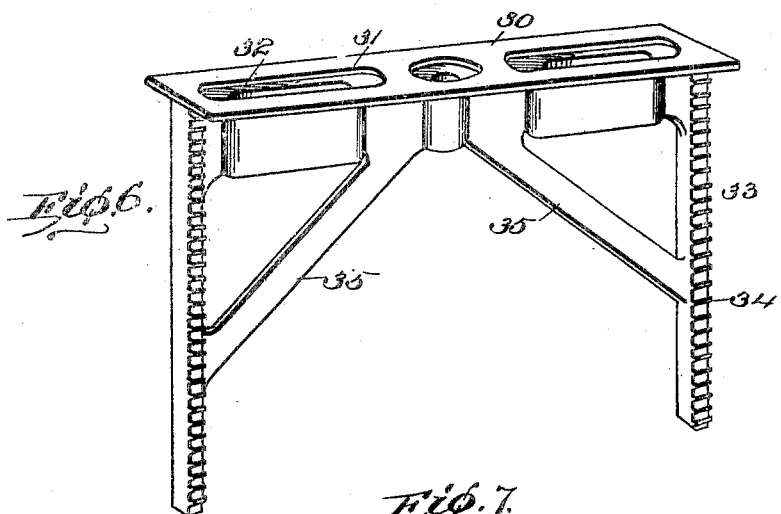
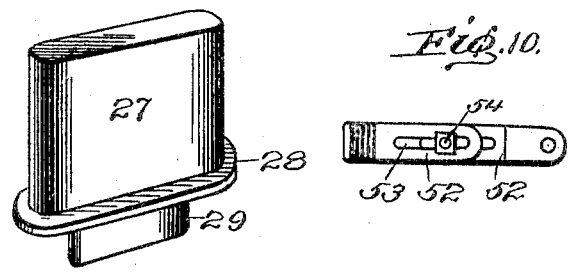
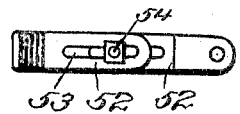
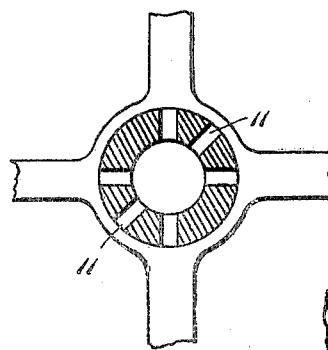
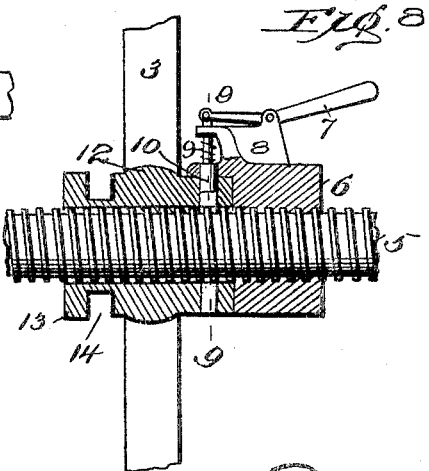

WILLIAM J. STERLING, OF NORFOLK, VIRGINIA, ASSIGNOR OF TWO-THIRDS TO A. S. J. GAMMON AND C. C. GRAVES, OF NORFOLK, VIRGINIA.

MOLDING APPARATUS.

No. 797,758. Specification of Letters Patent. Patented Aug. 22, 1905.

Application filed March 7, 1904. Serial No. 197,047.

*To all whom it may concern:*

Be it known that I, WILLIAM J. STERLING, a citizen of the United States, residing at Norfolk, in the county of Norfolk and State of Virginia, have invented certain new and useful Improvements in Molding Apparatus; and I do hereby declare the following to be a full, clear, and exact description of the invention, such as will enable others skilled in the art to which it appertains to make and use the same.

This invention relates to new and useful improvements in molding-machines designed especially for use in molding building-blocks; and it consists in certain features of novelty in the construction and arrangement of the operative parts thereof, all as hereinafter more fully described, and specifically set forth in the claims.

In the annexed drawings similar characters of reference indicate similar parts in all the views, in which—

Figure 1 is a top plan view. Fig. 2 is a longitudinal vertical sectional view on line 2 2 of Fig. 1. Fig. 3 is a side elevational view. Fig. 4 is a transverse sectional view on the line 4 4 of Fig. 1. Fig. 5 is a similar view illustrating the coöperative parts in a separated position. Fig. 6 is a detached detail of the pallet-support and elevating means. Fig. 7 is a detail of one of the end formers hereinafter referred to. Fig. 8 is a detached detail, partly in section, illustrating the construction of an end clutch mechanism hereinafter described. Fig. 9 is a sectional view thereof, taken on the line 9 9 of Fig. 8. Fig. 10 represents an enlarged detail side elevation of one of the corner-braces detached.

Referring to the annexed drawings, A is a supporting-frame. B is a trackway leading under the same and away therefrom.

C is a matrix-support mounted upon the frame A.

D is a matrix-frame mounted upon the support C, in which frame is mounted an expansible matrix comprising a plurality of coöperating parts, hereinafter referred to in detail, within which coöperating parts when assembled the building-block is formed.

Referring to Figs. 1 and 2, it will be observed that a plurality of shafts 1 are arranged parallel with the longitudinal axis of the frame D. Upon one of said shafts, at each end thereof, are gears 2 for actuating said shaft, said gears meshing with an intermediate idler 3, which in turn actuates a pinion 4, meshing with the gear $2^a$ on the other of said shafts 1, so that when motion is transmitted to either of the shafts 1 corresponding motion in an opposite direction is transmitted to the other of said shafts through the said gears referred to. The intermediate idler 3 is mounted upon a stud-shaft 5 at each end of the frame D, and said stud-shaft is provided with a coarse and deep screw-thread, as best illustrated in Fig. 8. Mounted upon the shaft 5 is a clutch-block 6, provided with the operating-lever 7, pivoted within an upwardly-projecting stud portion 8, said lever 7 having connected with its inner end a plunger 9, with an enlarged end portion 10 reciprocating in a seat in said portion 6 and adapted to project therebeyond into one of the radially-disposed recesses 11 in the hub of said idler, while the inner end of said hub 12 is provided with a channeled enlargement 13, in which the channel 14 is provided, within which is held a yoke 15 on bracket 16, which bracket is in turn connected with the end wall of said matrix-frame D, there being one of said idlers 3, shaft 5, and clutch mechanism at each end of said frame D, the shaft 5 projecting through said frame and being suitably supported therein. Upon each of the shafts 1 are arranged a plurality of gears 17, having any suitable form of clutch 18 coöperating with a lever 19, whereby said gears 17 may be connected with the shaft 1, but permitted to rotate idly thereon as may be desired. The matrix proper is composed of the walls 20 and 21, said walls 20 being the longitudinal side walls and 21 being the end walls thereof. Connected with the side walls are racks 22, adapted to pass through boxes 23 in said side walls and mesh with said gears 17 on the shafts 1, so that as said shafts 1 are rotated the gears 17 if locked thereto will actuate the side walls 20 of the matrix. In most cases it is desirable that strict parallelism be preserved between the said walls 20, as shown in the drawings; but in case it is desired to make building-blocks of tapering form or of irregular angular faces one or both ends of the walls 20 may be, through the clutch mechanism hereinbefore referred to on the shaft 1, set at an angle to the longitudinal axis of said matrix-frame D, after which the clutches may be connected so that pressure will be applied equally along the length of said walls 20 when desired. Secured above the walls 20 is preferably a hopper 24, into which material is dumped in its passage to the matrix. In the present instance this machine is designed especially for forming building-blocks which have a central opening 25 and elongated or elliptical openings 26 therein for obvious reasons, and to form said openings 26 formers 27 are provided whose shape corresponds with said openings, and said formers may be formed tapering upwardly, smaller at the upper end, if desired, for convenience of removal after completion of the block X in said matrix. Each of the formers 27 is preferably provided with an annular flange 28 and downwardly-projecting lip 29 to adapt the same to be held fixed in a suitable pallet commonly used with this class of machines. The pallet-support is best illustrated in Fig. 6, wherein cross-head 30 is provided with a plurality of sockets 31, having annular seats 32, adapted to interlock with the tongue 29 and flange 28 of former 27. Depending from the cross-head 30 are substantially T-shaped legs 33, provided with the racks 34 and the diagonal braces 35 for reinforcing the same. Upon the frame A are guideways 36, in which travel the said legs 33 of the cross-head, and suitably supported in said frame A is a transversely-disposed shaft 37, carrying gears 38, meshing with said racks 34, whereby upon rotation of said shaft 37 the cross-head 30 will be raised or lowered, as may be desired. The pallet proper rests upon the cross-head 30, as best illustrated in Fig. 5, wherein it will be seen that the pallet 39 rests upon the flanges, as 28, of the formers provided for forming the central openings in the building-blocks. Thus as the cross-head 30 is raised or lowered it carries with it said pallet 39. Any suitable actuating means for driving the several coöperating parts of the machine will answer the required purpose, and it may consist of a power-actuated means or, if desired, may be manually operated.

Referring to Fig. 5, it will be observed that the cross-head 30, with its superimposed pallet 39, is in a lowered position, whereby said pallet is brought to rest upon the pallet-supporting lugs 40 of the conveyer-arms 41, which comprise, preferably, any suitable rack-arm guided by the frame A and movable longitudinally thereof through the instrumentality of the pinions 42, carried on shaft 43, which is rotated by means of the cranks 44. After the pallet has been lowered to the position just indicated the conveyer is projected in the direction of the arrow shown in Fig. 2 to a point above the truck E therein illustrated, which truck is provided with the elevating-platform 45, which is moved upwardly through the instrumentality of a suitable lever 46 and intermediate links and bell-crank levers of any suitable construction, which will cause elevation of said platform 45 to raise it high enough to elevate said pallet 39 above the supporting-lugs 40, whereupon said truck E may be carried along its supporting-tracks 47 upon trackway B, after which said conveyer 41 may be retracted to bring the lugs 40 into the position shown in said Fig. 2, another pallet placed thereon, and the cross-head raised into position, said cross-head carrying the formers, which will project through coincident openings in said pallet and be raised into position within the matrix.

The operation of the machine is as follows: The parts of the expansible matrix 20 and 21 being placed in proper position through the actuating means heretofore described, the plastic or semiplastic material from which it is desired to form the building-block is thrown into the matrix formed thereby and allowed to remain therein a sufficient time to properly set, or it may be tamped therein, if desired, by any suitable mechanism, which mechanism, however, forms no part of this present invention, and such mechanisms being well known in the art are not here illustrated. After the block has been formed in said matrix the shafts 1 are rotated, thereby retracting the side walls 20 and in unison retracting the end walls 21, whereby said block is free from its retaining-matrix and in condition to be lowered with the cross-head 30, deposited upon the conveyer 40 41, and carried to a suitable place and deposited.

By referring to Fig. 1 it will be observed that the rack-arms 22 are pivotally connected with the members 20 of the matrix by means of the heads $22^a$ on said members 20.

It is obvious that minor changes in detail construction and operation may be made without departing from the spirit of my invention, all of which I desire to claim, except as my invention is hereinafter limited in the claims.

In practice I have found that the pressure upon the mold-pieces supported by the movable portions of the matrix is so great as to cause the said mold-pieces to move apart at the corners, and in order to avoid this objectionable spreading of the mold-pieces I employ corner braces or brackets 51, pivotally mounted and adapted to swing into contact with the contacting ends of said mold-pieces for locking said contacting ends together, each bracket 51 being formed with a right-angle bifurcation at its inner free end adapted to fit snugly the respective faces of the mold-pieces. One of the brackets 51 is seen in detail in Fig. 10, from which it will be seen that each of said brackets consists of overlapping plates 52 52, formed with longitudinal slots 53, said plates 52 being locked together with a suitable bolt 54, passed through said slots, the bolt 54 being adapted to be adjusted for permitting longitudinal adjustment of the bracket 51. The bracket 51 may thereby be lengthened or shortened to adapt the same to fit various sizes of molds.

It will of course be apparent that the discharging of the block downwardly through the bottom of the mold makes possible the removal of the block by mechanism actuated by the weight of the block. In other words, the pallet 39 moves downwardly under the weight of the block when the gear 38 is released, such gear being retained against too rapid rotation, preferably manually. By the use of the mechanism disclosed the block may thus be discharged without requiring the employment of elevating means for the block or for the matrix. The matrix may be stationary with respect to the block and the block removed without the necessity for lifting the same above the upper edge of the matrix. Of course it is to be understood that the mentioning of the matrix as being fixed has no bearing upon the mobility of the sides and ends constituting the matrix, but refers to the condition of the matrix with respect to the block when the same is being discharged.

Having thus described my invention, what I claim as new, and desire to secure by Letters Patent, is—

1. In a molding apparatus, a rigid frame, an expansible matrix having a plurality of angularly-movable members, gearing coöperating with some of said members, longitudinally-movable shafts coöperating with other of said members, gearing carried by said longitudinally-movable shafts for transmitting movement from one of the first-mentioned shafts to the other, and means for causing longitudinal movement of said movable shafts.

2. In a molding apparatus, an expansible matrix having a plurality of angularly-movable parts, shafts spaced apart, means connected with said shafts for moving some of said matrix members, a longitudinally-movable shaft interposed between said first-mentioned shafts, gearing rotatably mounted upon said longitudinally-movable shaft for transmitting movement from one of the first-mentioned shafts to the other thereof, and connections between said longitudinally-movable shaft and one of the matrix members.

3. In a molding apparatus, an expansible matrix having a plurality of angularly-movable members, shafts spaced apart, means actuated thereby for operating some of said matrix members, a longitudinally-movable shaft interposed between said first-mentioned shafts and connected with one of said matrix members, a gear rotatably mounted upon said longitudinally-movable shaft and designed for transmitting movement from one of said first-mentioned shafts to the other, and means for imparting movement from said gear to said longitudinally-movable shaft for moving the same longitudinally.

4. In a molding apparatus, an expansible matrix having a plurality of angularly-movable members, shafts spaced apart, means connected therewith for actuating some of said matrix members, a longitudinally-movable shaft connected with one of said matrix members, a gear-wheel rotatably mounted upon said longitudinally-movable shaft and designed to transmit movement from one of said first-mentioned shafts to the other, and a clutch member threaded onto said longitudinally-movable shaft and adapted to engage said gear-wheel.

5. In a molding apparatus, an expansible matrix, a shaft at each end thereof whose longitudinal axes are coincident with the longitudinal axis of said matrix, means connecting said shaft with parts of said matrix, means for causing longitudinal movement of said shafts for actuating said parts, means for moving other parts of said matrix, and connections between said last-mentioned means and said shafts for imparting movement to said shafts.

6. In a molding apparatus, an expansible matrix, a plurality of shafts, means on one of said shafts for moving one side of said matrix, means movable longitudinally of the other of said shafts for moving another portion of said matrix at an angle to the movement of said side, and means for imparting movement from the first-mentioned moving means to said second-mentioned means.

7. In a molding apparatus, the combination with a matrix, of a vertically-movable core designed to be positioned within said matrix, means carried by said core for supporting a block formed within said matrix, means for moving said core while supporting the block a distance equal to the thickness of the block for causing the block to be freed from said matrix, and a horizontally-moving carriage designed to be positioned in the path of movement of said block, said core being adapted to be moved below the block for freeing the block and permitting horizontal movement thereof with said carriage.

8. In a molding apparatus, the combination with a matrix, of means for lowering a block formed within said matrix below the same for freeing the block from the matrix, and a horizontally-movable carriage adapted to be positioned within the plane of movement of said block.

9. In a molding apparatus, a supporting-frame, a pallet-support, means for elevating the same, a matrix-frame carried by said supporting-frame, a longitudinally-movable shaft operable in said matrix-frame, and a matrix-section adapted to be actuated thereby.

10. In a molding apparatus, a matrix-frame, parallel shafts extending longitudinally thereof, intermediate shafts journaled in said frame, and longitudinally movable therein, and a clutch member on said frame adapted to engage one of said longitudinally-movable shafts.

11. In a molding apparatus, a supporting-frame, a matrix-frame supported thereby, brackets thereon, a plurality of substantially parallel shafts supported thereby, gears on said shafts, an intermediate longitudinally-movable shaft, and a gear thereon actuated by said first-mentioned gears.

12. In a molding apparatus, a matrix-frame, a rotatable shaft supported thereby, a gear on said shaft, a longitudinally-movable shaft supported by said frame, a gear thereon actuated by said first-mentioned gear, and means for moving said shaft longitudinally.

13. In a molding apparatus, an expansible matrix comprising a plurality of parts, substantially parallel rack-arms pivotally connected with one of said parts, actuating means therefor, and a longitudinally-movable shaft connected with another part of said matrix and driven from said actuating means.

14. In a molding apparatus, the combination with a bed, of longitudinally-movable rack-bars carried thereby, a mold above said rack-bars, means for supporting a pallet at the base of said mold, and means for lowering said pallet upon said rack-bars, and means for actuating said rack-bars for moving the pallet out of the plane of movement of said pallet-lowering means.

15. In a molding apparatus, the combination with a matrix having movable sides and mold-pieces adapted to be supported thereby, of pivotally-mounted braces designed to engage the ends of said mold-pieces for preventing lateral spreading thereof.

16. In a molding apparatus, the combination with a matrix having movable sides and mold-pieces adapted to be supported by said sides, of a plurality of movably-mounted braces formed with right angle, bifurcated ends adapted to engage the corners of said mold-pieces for preventing spreading thereof.

17. In a molding apparatus, the combination with a matrix having movably-mounted sides and mold-pieces adapted to be supported thereby, of movably-mounted braces designed to engage the ends of said mold-pieces, and means for permitting adjustment of the length of said braces.

18. In a molding apparatus, the combination with a stationary matrix, of means beneath said matrix for receiving and lowering the block contained thereby downwardly through the bottom thereof, and means for removing said block laterally after its discharge through the bottom of the matrix.

In testimony whereof I hereunto affix my signature in presence of two witnesses.

WILLIAM J. STERLING.

Witnesses:
 A. S. J. GAMMON,
 J. C. LLOYD GORDON.